(12) United States Patent
Sim et al.

(10) Patent No.: US 9,418,569 B2
(45) Date of Patent: Aug. 16, 2016

(54) METHODS AND SYSTEM FOR VISUALLY REPRESENTING A RATE OF WRITING A PLURALITY OF IDENTICAL CHINESE CHARACTERS FOR AT LEAST ONE USER ON A DISPLAY

(75) Inventors: Wong Hoo Sim, Singapore (SG); Kin Fui Chong, Singapore (SG); Xin Yi Wong, Singapore (SG)

(73) Assignee: Creative Technology Ltd, Singapore (SG)

( * ) Notice: Subject to any disclaimer, the term of this patent is extended or adjusted under 35 U.S.C. 154(b) by 722 days.

(21) Appl. No.: 12/976,974

(22) Filed: Dec. 22, 2010

(65) Prior Publication Data
US 2012/0164608 A1 Jun. 28, 2012

(51) Int. Cl.
| | |
|---|---|
| *G09B 11/00* | (2006.01) |
| *G09B 7/00* | (2006.01) |
| *G09B 19/06* | (2006.01) |
| *G06F 3/0488* | (2013.01) |
| *G09B 5/00* | (2006.01) |
| *G06F 3/0354* | (2013.01) |
| *G06K 9/22* | (2006.01) |
| *G09B 5/06* | (2006.01) |
| *G06F 3/03* | (2006.01) |

(52) U.S. Cl.
CPC *G09B 11/00* (2013.01); *G09B 7/00* (2013.01); *G09B 19/06* (2013.01); *G06F 3/0317* (2013.01); *G06F 3/03545* (2013.01); *G06F 3/04883* (2013.01); *G06K 9/222* (2013.01); *G09B 5/00* (2013.01); *G09B 5/06* (2013.01)

(58) Field of Classification Search
CPC .......... G09B 7/00; G09B 17/00; G09B 19/04; G09B 19/06; G09B 7/02; G09B 5/06; G09B 17/003
USPC .......................................... 434/155–167, 176
See application file for complete search history.

(56) References Cited

U.S. PATENT DOCUMENTS

| | | | | |
|---|---|---|---|---|
| 5,257,938 | A  * | 11/1993 | Tien ............................... | 434/128 |
| 6,035,063 | A  * | 3/2000 | Nakashima et al. .......... | 382/187 |
| 6,111,976 | A  * | 8/2000 | Rylander ...................... | 382/114 |
| 6,185,333 | B1 * | 2/2001 | Arai et al. ..................... | 382/187 |
| 6,215,901 | B1 * | 4/2001 | Schwartz ...................... | 382/186 |
| 6,669,562 | B1 * | 12/2003 | Shiino ............................ | 463/31 |
| 6,694,056 | B1 * | 2/2004 | Ito et al. ....................... | 382/186 |
| 6,697,524 | B1 * | 2/2004 | Arai et al. ..................... | 382/187 |
| 2003/0182585 | A1 * | 9/2003 | Murase et al. ................ | 713/202 |
| 2006/0246410 | A1 * | 11/2006 | Iwayama ...................... | 434/323 |
| 2007/0177801 | A1 * | 8/2007 | Kawamoto et al. .......... | 382/187 |
| 2007/0218430 | A1 * | 9/2007 | Chang et al. .................. | 434/155 |
| 2007/0263002 | A1 * | 11/2007 | Boylan ........................... | 345/473 |
| 2008/0102424 | A1 * | 5/2008 | Holljes ......................... | 434/247 |
| 2009/0068624 | A1 * | 3/2009 | Schulken ...................... | 434/129 |
| 2009/0253107 | A1 * | 10/2009 | Marggraff ..................... | 434/162 |
| 2010/0182328 | A1 * | 7/2010 | Pirchio ......................... | 345/474 |
| 2010/0184563 | A1 * | 7/2010 | Molyneux et al. ............... | 482/1 |

\* cited by examiner

*Primary Examiner* — Jack Yip
(74) *Attorney, Agent, or Firm* — Russell Swerdon; Desmund Gean

(57) ABSTRACT

There are provided methods and a system for visually representing a rate of writing a plurality of identical Chinese characters for at least one user on a first portion of a display, with the visual representation having both a discrete movement component and a rate of activity component.

22 Claims, 5 Drawing Sheets

| 102 | 104 | 106 | 108 |
|---|---|---|---|
| Pronunciation | Word Appearance | Order of Writing Strokes | No of Writing Stokes |
|  |  |  |  |
|  |  |  |  |
|  |  |  |  |
|  |  |  |  |
|  |  |  |  |

METHODS AND SYSTEM FOR VISUALLY REPRESENTING A RATE OF WRITING A PLURALITY OF IDENTICAL CHINESE CHARACTERS FOR AT LEAST ONE USER ON A DISPLAY

FIELD OF INVENTION

The present invention relates to the field of Chinese language education, specifically pertaining to the writing of Chinese characters.

BACKGROUND

The learning of the Chinese language has increased in popularity with the growing importance of China in the global economy. An increasing number of people of all races are learning the Chinese language and are doing so using a diverse range of learning methodologies.

The diverse range of learning methodologies covers a wide range of cost for learners of the Chinese language. Traditional methods of teaching the Chinese language carried out at a learning institution in brick-and-mortar venues typically cost more and arguably are more effective, while self-learning methods of learning the Chinese language typically cost less but are usually less effective.

In addition, current learning methodologies for the Chinese language typically encounter resistance from the learners as the learning methodologies are perceived to lack a "fun" aspect and learners correspondingly lose interest in the Chinese language. This is especially so for learners who are either still of school-going age or learning the Chinese language as a recreational hobby.

As such, it would be desirable if a methodology for learning the Chinese language was provided which allowed for a "fun" aspect for learners, is affordable and is effective in enabling learners to learn the Chinese language.

SUMMARY

In a first aspect, there is provided a method for visually representing a rate of writing a plurality of identical Chinese characters for a single user on a first portion of a display, with the visual representation having both a discrete movement component and a rate of activity component. The method includes presenting the single user with the Chinese character on a second portion of the display; determining both a number of writing strokes and a correct order of the writing strokes required for the Chinese character using a data processor coupled to the display; counting writing strokes input through a contact-sensitive surface using the data processor coupled to the display; determining a rate of writing stroke input through the contact-sensitive surface using the data processor coupled to the display; and determining if an order of the writing strokes input through the contact-sensitive surface is in accordance with the correct order using the data processor coupled to the display.

It is advantageous that the discrete movement component is dependent upon both the counted input writing strokes, and the order of input writing strokes while the rate of activity component is dependent upon the rate of writing stroke input.

The visual representation may be in a form of a digitized visual icon capable of moving in a pre-defined manner, the digitized visual icon including at least one moveable feature to denote the rate of activity component. The at least one moveable feature may be selected from, for example, limbs, eyes, wheels, fins, flippers, wings and the like. The digitized visual icon may preferably be in a form selected from, for example, an animal, an organism, a vehicle, a humanoid and so forth.

The contact-sensitive surface may be either incorporated with or separate from the display. Preferably, the number of writing strokes and the correct order of the writing strokes required for the Chinese character is determined by the data processor using a look-up table.

The Chinese character is preferably deemed to be not written when the order of the writing strokes input through the contact-sensitive surface is not in accordance with the correct order.

In a second aspect, there is provided a method for visually representing a rate of writing a plurality of identical Chinese characters for each of a plurality of users on a first portion of a display of each of the plurality of users, with the visual representation for each of the plurality of users having both a discrete movement component and a rate of activity component. The method includes connecting a data processor for each of the plurality of users to a central server via a data network; presenting the data processor for each of the plurality of users with an identical Chinese character provided by the central server, the Chinese character being shown on a second portion of the display for writing; determining both a number of writing strokes and a correct order of the writing strokes required for the Chinese character using a data processor coupled to the display of each of the plurality of users; counting writing strokes input through a contact-sensitive surface for each of the plurality of users using the data processor coupled to the display of each of the plurality of users; determining a rate of writing stroke input through the contact-sensitive surface for each of the plurality of users using the data processor coupled to the display of each of the plurality of users; and determining if an order of the writing strokes input through the contact-sensitive surface is in accordance with the correct order for each of the plurality of users using the data processor coupled to the display of each of the plurality of users.

It is advantageous that the discrete movement component is dependent upon both the counted input writing strokes for each of the plurality of users, and the order of input writing strokes while the rate of activity component is dependent upon the rate of writing stroke input for each of the plurality of users.

The visual representation for a rate of writing for a Chinese character for each of a plurality of users may be generated by the data processor coupled to the display of each of the plurality of users, and the generated visual representation for each of the plurality of users may be transmitted to the central server and combined at the central server to form a combined view of the visual representation for a rate of writing for a Chinese character for the plurality of users, the combined view being shown in the first portion of the display.

In the method, the following: both a number of writing strokes and a correct order of the writing strokes required for the Chinese character; writing strokes input through a contact-sensitive surface for each of the plurality of users; an order of the writing strokes input through the contact-sensitive surface is in accordance with the correct order for each of the plurality of users using the data processor coupled to the display of each of the plurality of users; and a rate of writing stroke input through the contact-sensitive surface for each of the plurality of users; are transmitted to the central server and processed at the central server to form a combined view of the visual representation for a rate of writing for a Chinese character for the plurality of users, the combined view being shown in the first portion of the display.

The visual representation may be in a form of a digitized visual icon capable of moving in a pre-defined manner, the digitized visual icon including at least one moveable feature to denote the rate of activity component. The at least one moveable feature may be selected from, for example, limbs, eyes, wheels, fins, flippers, wings and the like. The digitized visual icon may be in a form such as, for example, an animal, an organism, a vehicle, a humanoid and so forth.

The contact-sensitive surface may be either incorporated with or separate from the display. The number of writing strokes and the correct order of the writing strokes required for the Chinese character may be determined by the data processor coupled to the display of each of the plurality of users using a look-up table. The data processor for each of the plurality of users may be wirelessly connected to the central server.

In the method, the Chinese character is deemed to be not written when the order of the writing strokes input through the contact-sensitive surface is not in accordance with the correct order for any of the plurality of users.

There is also provided a system for visually representing a rate of writing a plurality of identical Chinese characters for each of a plurality of users on a first portion of a display of each of the plurality of users, with the visual representation for each of the plurality of users having both a discrete movement component and a rate of activity component. The system includes a data processor coupled to the display for each of the plurality of users; and a central server wirelessly connected to the data processor coupled to the display for each of the plurality of users.

Preferably, the data processor is for determining both a number of writing strokes and a correct order of the writing strokes required for the Chinese character provided by the central server, counting writing strokes input through a contact-sensitive surface for each of the plurality of users, determining if an order of the writing strokes input through the contact-sensitive surface is in accordance with the correct order for each of the plurality of users, and determining a rate of writing stroke input through the contact-sensitive surface for each of the plurality of users. The discrete movement component may be dependent upon both the counted input writing strokes for each of the plurality of users, and the order of input writing strokes while the rate of activity component is dependent upon the rate of writing stroke input for each of the plurality of users.

In the system, the visual representation for a rate of writing a plurality of identical Chinese characters for each of a plurality of users may be generated by the data processor coupled to the display of each of the plurality of users, and whereby the generated visual representation for the plurality of users is transmitted to the central server and combined at the central server to form a combined view of the visual representation for a rate of writing for a Chinese character for the plurality of users, the combined view being shown in the first portion of the display.

In the system, the following: both the number of writing strokes and the correct order of the writing strokes required for the Chinese character; the writing strokes input through a contact-sensitive surface for each of the plurality of users; the rate of writing stroke input through the contact-sensitive surface for each of the plurality of users; and the order of the writing strokes input through the contact-sensitive surface is in accordance with the correct order for each of the plurality of users using the data processor coupled to the display of each of the plurality of users; are transmitted to the central server and processed at the central server to form a combined view of the visual representation for a rate of writing for a Chinese character for the plurality of users, the combined view being shown in the first portion of the display.

Preferably, the visual representation is in a form of a digitized visual icon capable of moving in a pre-defined manner, the digitized visual icon including at least one moveable feature to denote the rate of activity component. The at least one moveable feature may be selected from, for example, limbs, eyes, wheels, fins, flippers, wings and so forth. The digitized visual icon may be in a form selected from, for example, an animal, an organism, a vehicle, a humanoid and so forth.

The contact-sensitive surface may be either incorporated with or separate from the display.

Preferably, the number of writing strokes and the correct order of the writing strokes required for the Chinese character may be determined by the data processor coupled to the display of each of the plurality of users using a look-up table.

DESCRIPTION OF FIGURES

In order that the present invention may be fully understood and readily put into practical effect, there shall now be described by way of non-limitative example only preferred embodiments of the present invention, the description being with reference to the accompanying illustrative drawings.

FIG. 7 shows an example of a look-up table used for the present invention.

DESCRIPTION OF PREFERRED EMBODIMENTS

The present invention relates to a method in a form of several embodiments which will be described in respective process flows. It should be noted that an order of the respective process flows of the embodiments of the method need not be strictly adhered to in order to fall within a scope of the present invention. A system of the present invention will also be described in a manner for illustration and should not be construed to be limiting to the manner as described.

Figure 1:
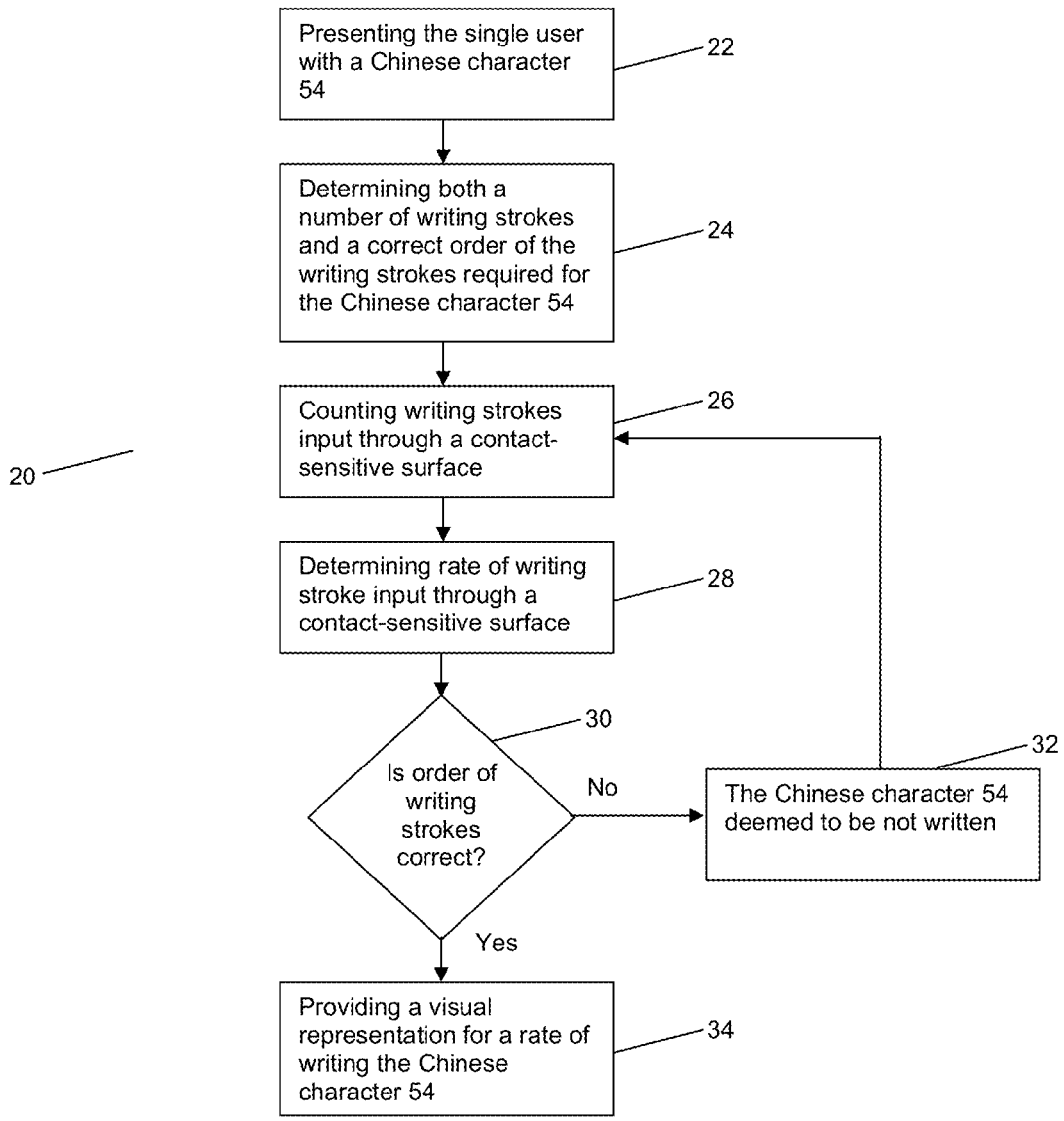
FIG. 1 shows a process flow for a first embodiment for a method of the present invention.

Referring to FIG. 1, there is shown a process flow for a first embodiment of a method 20 for visually representing a rate of writing a plurality of identical Chinese characters for a single user on a first portion of a display. The writing of the plurality of identical Chinese characters may be for educational purposes, whereby repetitive writing of the Chinese character aids in the learning of the Chinese character, and correspondingly, the Chinese language. The visual representation of a rate of writing the plurality of identical Chinese characters may have both a discrete movement component and a rate of activity component. The visual representation may be in a form of a digitized visual icon capable of moving in a pre-defined manner such as a path, and the digitized visual icon may include at least one moveable feature to denote the rate of activity component. The digitized visual icon is in a form of, for example, an animal, an organism, a vehicle, a humanoid, and so forth. The at least one moveable feature is selected from, for example, limbs, eyes, wheels, fins, flippers, wings, and so forth. The moveable feature is animated but that cannot be depicted in the Figures.

Figure 3:
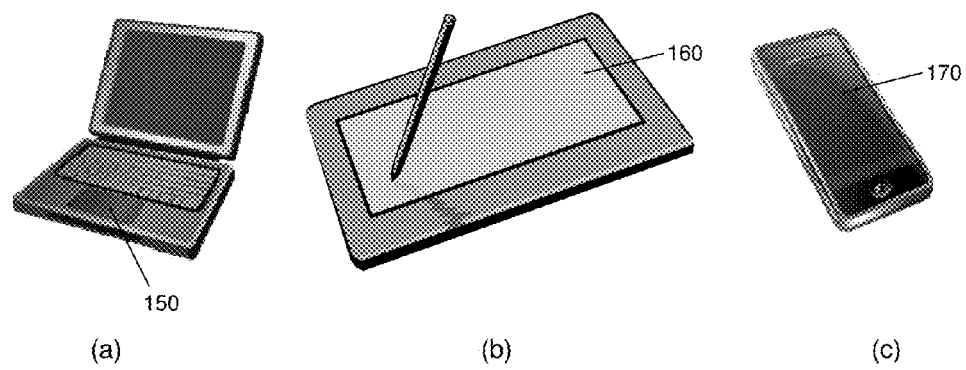
FIG. 3 shows possible devices used for the first embodiment for a method of the present invention.

The display is a part of a device, typically a screen for viewing content running on the device, whereby a sample selection of the device is shown in FIG. 3. FIG. 3(a) shows a portable computer, FIG. 3(b) shows a tablet computer while FIG. 3(c) shows a mobile phone. The display for the device may be a contact-sensitive screen.

Figure 2:
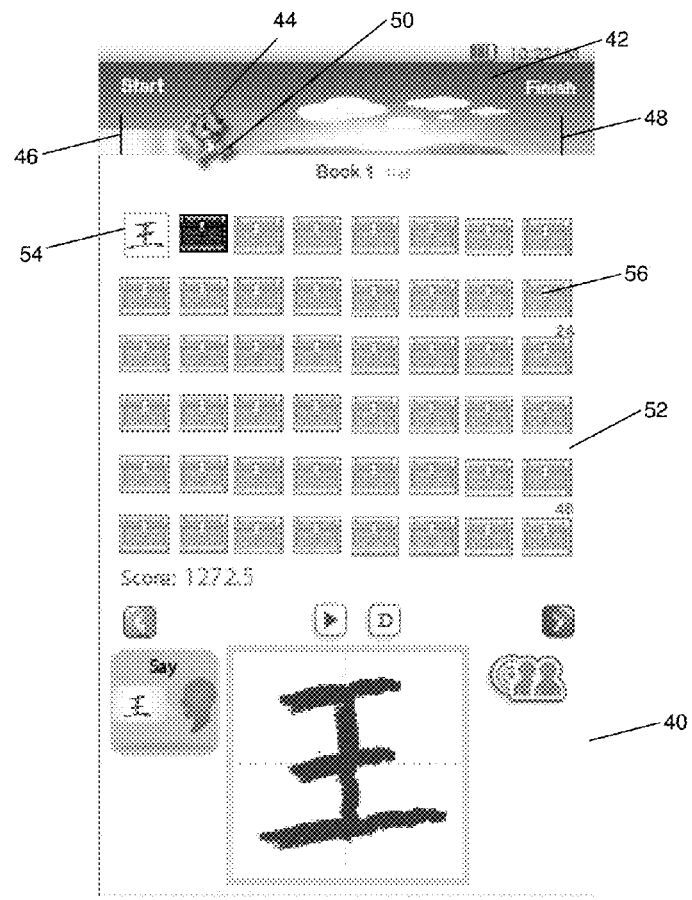
FIG. 2 shows a sample representation for contents on a display for a user for the first embodiment of FIG. 1.

Referring to FIG. 2, there is shown a sample representation for contents on a display 40 for a user for the first embodiment of FIG. 1. A first portion 42 of the display 40 shows the rate of writing a plurality of identical Chinese characters. The digitized visual icon is in a form of a lizard 44 where the pre-defined manner is a straight path from a starting point 46 to an end point 48. Feet 50 of the lizard 44 are the moveable feature (animated for example in a shuffling manner) of the digitized visual icon. A second portion 52 of the display 40 shows the plurality of identical Chinese characters 54 after they are appropriately written by the single user, whereby a treasure chest 56 opens up to provide credits when a Chinese character 54 is appropriately written by the single user. Thus, the single user is able to know a number of Chinese characters 54 which have been completed appropriately from a number of shown Chinese characters 54. The credits may be used either as a form of scoring or as a form of currency. The digitized visual icon may be able to demonstrate other forms of actions, such as, for example, cheering (when the digitized visual icon reaches the end point 48), clapping (when the user finishes writing a Chinese character 54), sleeping (when the user stops writing), and so forth.

The method 20 will be more clearly described with reference to both FIGS. 1 and 2. The method 20 includes presenting the single user with the Chinese character 54 on the second portion 52 of the display 40 (22) in a similar manner as per what is shown in FIG. 2. Then, the method 20 also determines both a number of writing strokes and a correct order of the writing strokes required for the Chinese character 54 using a data processor coupled to the display 40. The number of writing strokes and the correct order of the writing strokes required for the Chinese character 54 is determined by the data processor using a look-up table 100, an example which is shown in FIG. 7. The look-up table 100 may include columns for romanized pronunciation 102, word appearance 104, order of writing strokes 106 and number of writing strokes 108. Sample Chinese characters have not been provided in FIG. 7 as a Chinese font-type may not be present in all computers and as such may not be reproduced consistently when publishing the present specification.

The method 20 also includes counting writing strokes input through a contact-sensitive surface (26) using the data processor coupled to the display 40. The contact-sensitive surface may be either incorporated with or separate from the display 40. Referring to FIG. 3, the contact-sensitive surface may be a touch pad 150 of the portable computer of FIG. 3(a), a touch-screen 160 of the tablet computer of FIG. 3(b), or a touch-screen 170 of the mobile phone of FIG. 3(c). It should be noted that the touch pad 150 is separate from the display 40 while the touch-screens 160, 170 are incorporated with the display 40.

There is also the determining of a rate of writing stroke input through the contact-sensitive surface using the data processor coupled to the display 40 (28). The rate of writing stroke provides an indication of how quickly the Chinese character 54 is being written. The rate of activity component of the visual representation is dependent upon the rate of writing stroke input such that the higher the rate of writing stroke, the higher the rate of activity component, which translates to faster movement of the feet 50 of the lizard 44 in FIG. 2.

The method 20 also includes determining if an order of the writing strokes input through the contact-sensitive surface is in accordance with the correct order using the data processor coupled to the display (30). The Chinese character 54 is deemed to be not written when the order of the writing strokes input through the contact-sensitive surface is not in accordance with the correct order (32). When the Chinese character 54 is deemed to be not written, the method 20 is redirected to counting writing strokes input through a contact-sensitive surface (26) using the data processor coupled to the display 40. The discrete movement component of the visual representation is dependent upon both the counted input writing strokes, and the order of input writing strokes such that the higher a number of Chinese characters 54 being written, the greater the discrete movement, which translates to the lizard 44 moving closer to the end point 48 in FIG. 2.

It should be noted that the method 20 is carried out when each Chinese character 54 is written, and this advantageously provides the visual representation of writing the plurality of identical Chinese characters 54 which is fun and interactive for the users (34). The users are able to refer to the visual representation when writing the plurality of identical Chinese characters 54 and monitor both their progress (discrete movement of digitized visual icon) and how their writing of the Chinese character 54 affects the rate of activity of the digitized visual icon (in terms of movement of the at least one moveable feature).

Figure 4:
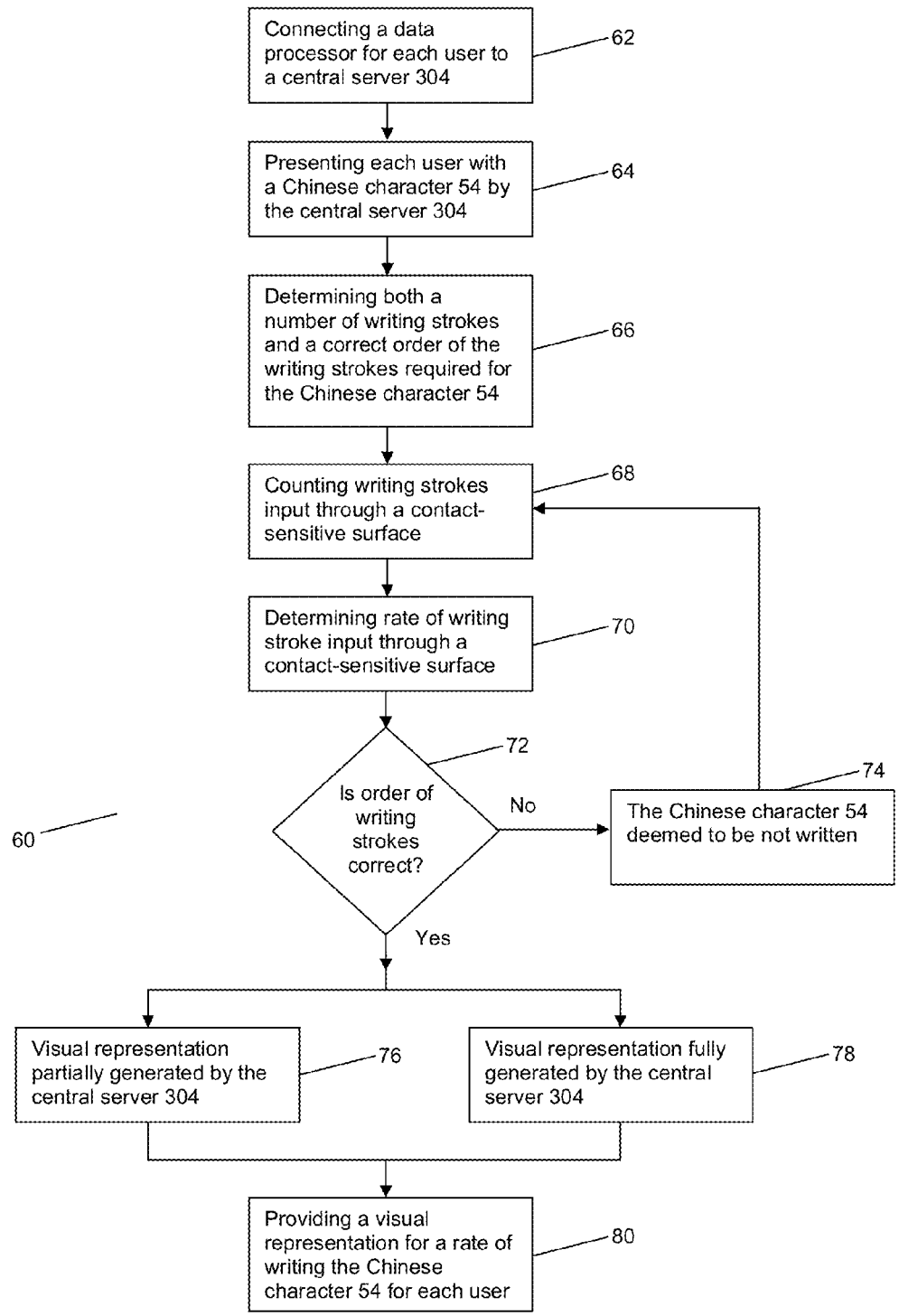
FIG. 4 shows a process flow for a second embodiment for the method of the present invention.

Referring to FIG. 4, there is shown a process flow for a second embodiment of a method 60 for visually representing a rate of writing a plurality of identical Chinese characters for each of a plurality of users on a first portion of a display of each of the plurality of users. The writing of the plurality of identical Chinese characters may be for educational purposes, whereby repetitive writing of the Chinese character aids in the learning of the Chinese character and correspondingly, the Chinese language. Being able to visually represent a rate of writing a plurality of identical Chinese characters for each of a plurality of users on a first portion of a display of each of the plurality of users also enables a competition of writing speed and writing accuracy amongst the plurality of users. The competition may be beneficial for the plurality of users in relation to the learning of the Chinese language.

The visual representation of a rate of writing the plurality of identical Chinese characters for each of the plurality of users may have both a discrete movement component and a rate of activity component. The visual representation may be in a form of a digitized visual icon capable of moving in a pre-defined manner such as a path, and the digitized visual icon may include at least one moveable feature to denote the rate of activity component. The digitized visual icon is in a form of, for example, an animal, an organism, a vehicle, a humanoid, and so forth. The at least one moveable feature is selected from, for example, limbs, eyes, wheels, fins, flippers, wings, and so forth. The moveable feature is animated but that cannot be depicted in the Figures.

The display is a part of a device, typically a screen for viewing content running on the device, whereby a sample selection of the device is shown in FIG. 3. FIG. 3(a) shows a portable computer, FIG. 3(b) shows a tablet computer while FIG. 3(c) shows a mobile phone. The display for the device may be a contact-sensitive screen.

Figure 5:
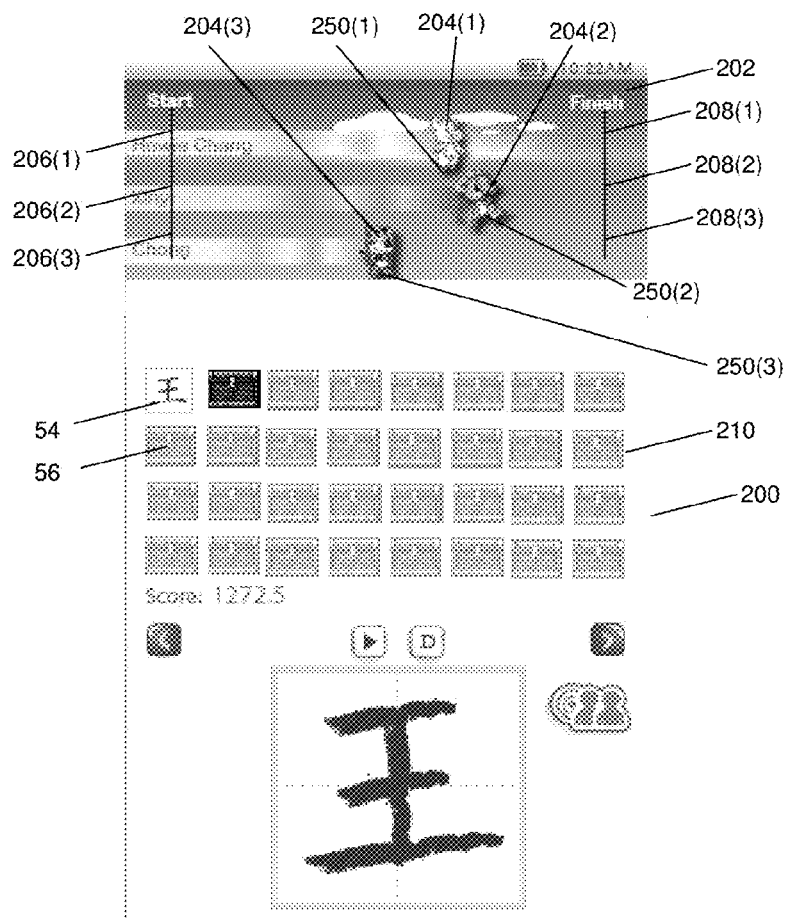
FIG. 5 shows a sample representation for contents on a display for every user for the second embodiment of FIG. 4.

Referring to FIG. 5, there is shown a sample representation for contents on a display 200 for a user for the second embodiment of FIG. 4. A third portion 202 of the display 200 shows the rate of writing a plurality of identical Chinese characters for the plurality of users (in this instance, Howie Chang, Xinyi, and Chong). The digitized visual icon for each of the plurality of users is in a form of a pig 204(1), a mouse 204(2), a tiger 204(3) where the predefined manner is a straight path from a respective starting point 206(1), 206(2), 206(3) to a respective end point 208(1), 208(2), 208(3). Feet 250(1), 250(2), 250(3) of the respective pig 204(1), mouse 204(2), tiger 204(3) are the moveable feature (animated for example in a shuffling manner) of the digitized visual icon. A fourth portion 210 of the display 200 shows the plurality of identical Chinese characters 54 after they are appropriately written by each user, whereby a treasure chest 56 opens up to provide credits when a Chinese character 54 is appropriately written by the user. Thus, each user is able to know a number of Chinese characters 54 which have been completed appropriately from a number of shown Chinese characters 54. The credits may be used either as a form of scoring or as a form of currency. The digitized visual icon may be able to demonstrate other forms of actions, such as, for example, cheering (when the digitized visual icon reaches the end point 48), clapping (when the user finishes writing a Chinese character 54), sleeping (when the user stops writing), and so forth.

The method 60 will be more clearly described with reference to both FIGS. 4 and 5. The method 60 includes connecting a data processor for each of the plurality of users to a central server via a data network (62). The data processor for each of the plurality of users may be coupled to a respective display 200 and may be wirelessly connected to the central server. Then, the method 60 presents the data processor for each of the plurality of users with an identical Chinese character provided by the central server (64) with the Chinese character being shown on a fourth portion 210 of the display 200 as shown in FIG. 5. Then the method 60 determines both a number of writing strokes and a correct order of the writing strokes required for the Chinese character (66) using a data processor coupled to the display 200 of each of the plurality of users. The number of writing strokes and the correct order of the writing strokes required for the Chinese character 54 is determined by the data processor using a look-up table 100, an example which is shown in FIG. 7. The look-up table 100 may include columns for romanized pronunciation 102, word appearance 104, order of writing strokes 106 and number of writing strokes 108. Sample Chinese characters have not been provided in FIG. 7 as a Chinese font-type may not be present in all computers and as such may not be reproduced consistently when publishing the present specification.

The method 60 also includes counting writing strokes input through a contact-sensitive surface (68) for each of the plurality of users using the data processor coupled to the display 200 of each of the plurality of users. The contact-sensitive surface may be either incorporated with or separate from the display 200. Referring to FIG. 3, the contact-sensitive surface may be a touch pad 150 of the portable computer of FIG. 3(a), a touch-screen 160 of the tablet computer of FIG. 3(b), or a touch-screen 170 of the mobile phone of FIG. 3(c). It should be noted that the touch pad 150 is separate from the display 200 while the touch-screens 160, 170 are incorporated with the display 200.

The method 60 also includes determining a rate of writing stroke input through the contact-sensitive surface for each of the plurality of users (70) using the data processor coupled to the display 200 of each of the plurality of users. The rate of writing stroke provides an indication of how quickly the Chinese character 54 is being written. The rate of activity component of the visual representation is dependent upon the rate of writing stroke input such that the higher the rate of writing stroke, the higher the rate of activity component, which translates to faster movement of the feet 250(1), 250(2), 250(3) of the respective pig 204(1), mouse 204(2), tiger 204(3) in FIG. 5.

There is also an aspect of determining if an order of the writing strokes input through the contact-sensitive surface is in accordance with the correct order for each of the plurality of users using the data processor coupled to the display 200 of each of the plurality of users (72). The Chinese character 54 is deemed to be not written when the order of the writing strokes input through the contact-sensitive surface is not in accordance with the correct order (74). When the Chinese character 54 is deemed to be not written, the method 60 is redirected to counting writing strokes input through a contact-sensitive surface (68) using the data processor coupled to the display 200 of each of the plurality of users. The discrete movement component of the visual representation is dependent upon both the counted input writing strokes, and the order of input writing strokes such that the higher a number of Chinese characters 54 being written, the greater the discrete movement, which translates to the pig 204(1), mouse 204(2), tiger 204(3) moving closer to the respective end points 208(1), 208(2), 208(3) in FIG. 5.

In the method 60, the visual representation for a rate of writing for a Chinese character 54 for each of a plurality of users is generated by the data processor coupled to the display 200 of each of the plurality of users, and whereby the generated visual representation for each of the plurality of users is transmitted to the central server and combined at the central server to form a combined view of the visual representation for a rate of writing for a Chinese character 54 for the plurality of users, the combined view being shown in the first portion 202 of the display 200 as shown in FIG. 5. In this regard, the visual representation is partially generated by the central server (76).

Alternatively, both a number of writing strokes and a correct order of the writing strokes required for the Chinese character; writing strokes input through a contact-sensitive surface for each of the plurality of users; an order of the writing strokes input through the contact-sensitive surface is in accordance with the correct order for each of the plurality of users using the data processor coupled to the display of each of the plurality of users; and a rate of writing stroke input through the contact-sensitive surface for each of the plurality of users, are transmitted to the central server and processed at the central server to form a combined view of the visual representation for a rate of writing for a Chinese character for the plurality of users, the combined view being shown in the first portion 202 of the display 200 as shown in FIG. 5. In this regard, the visual representation is alternatively fully generated by the central server (76).

It should be noted that the method 60 is carried out when each Chinese character 54 is written, and this advantageously provides the visual representation of writing the plurality of identical Chinese characters 54 which is fun and interactive for each user (80). Each user is able to refer to the visual representation when writing the plurality of identical Chinese characters 54 and monitor both their progress (discrete movement of digitized visual icon) and how their writing of the Chinese character 54 affects the rate of activity of the digitized visual icon (in terms of movement of the at least one moveable feature) with respect to other users.

Figure 6:
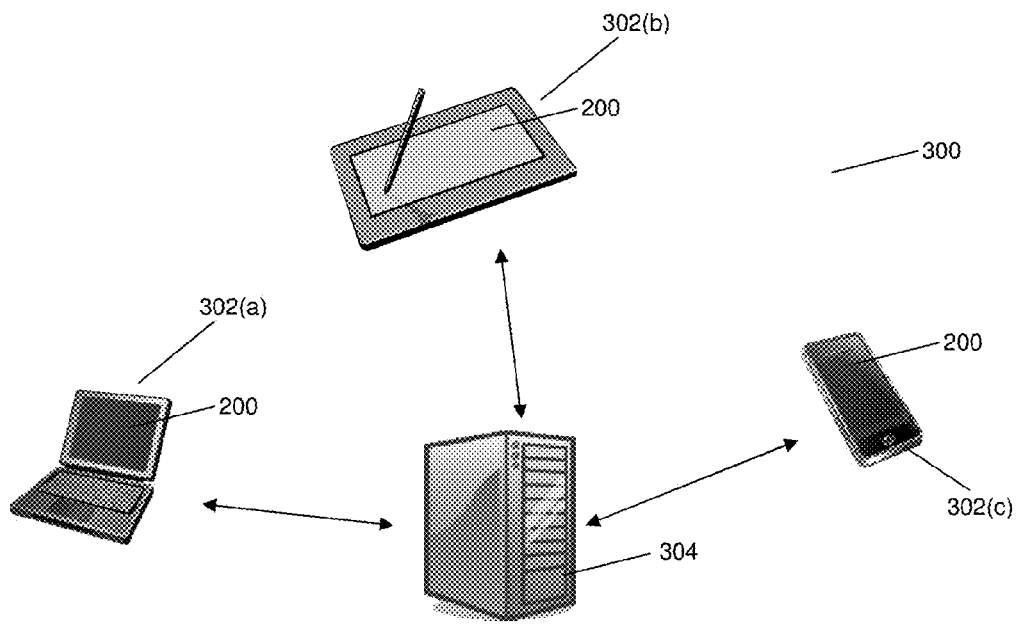
FIG. 6 shows an overview for a system of the present invention.

Referring to FIG. 6, there is provided another aspect of the present invention. There is provided a system 300 for visually representing a rate of writing a plurality of identical Chinese characters for each of a plurality of users on a first portion of a display of each of the plurality of users. The writing of the plurality of identical Chinese characters may be for educational purposes, whereby repetitive writing of the Chinese character aids in the learning of the Chinese character and correspondingly, the Chinese language. Being able to visually represent a rate of writing a plurality of identical Chinese characters for each of a plurality of users on a first portion of a display of each of the plurality of users also enables a competition of writing speed and writing accuracy amongst the plurality of users. The competition may be beneficial for the plurality of users in relation to the learning of the Chinese language.

The visual representation of a rate of writing the plurality of identical Chinese characters for each of the plurality of users may have both a discrete movement component and a rate of activity component. The visual representation may be in a form of a digitized visual icon capable of moving in a pre-defined manner such as a path, and the digitized visual icon may include at least one moveable feature to denote the rate of activity component. The digitized visual icon is in a form of, for example, an animal, an organism, a vehicle, a humanoid, and so forth. The at least one moveable feature is selected from, for example, limbs, eyes, wheels, fins, flippers, wings, and so forth. The moveable feature is animated but that cannot be depicted in the Figures.

The system 300 may include a data processor coupled to the display for each of the plurality of users. The data processor coupled to the display may be a device like a portable computer 302(a), a tablet computer 302(b) and a mobile phone 302(c) as shown in FIG. 6. In the system 300, a display 200 for the portable computer 302(a), the tablet computer 302(b) and the mobile phone 302(c) would be similar to what is depicted in FIG. 5. The system 300 also includes a central server 304 wirelessly connected to the data processor coupled to the display for each of the plurality of users.

Referring to FIG. 5, there is shown a sample representation for contents on a display 200 for a user in the system 300. A third portion 202 of the display 200 shows the rate of writing a plurality of identical Chinese characters for the plurality of users (in this instance, Howie Chang, Xinyi, and Chong). The digitized visual icon for each of the plurality of users is in a form of a pig 204(1), a mouse 204(2), a tiger 204(3) where the pre-defined manner is a straight path from a respective starting point 206(1), 206(2), 206(3) to a respective end point 208(1), 208(2), 208(3). Feet 250(1), 250(2), 250(3) of the respective pig 204(1), mouse 204(2), tiger 204(3) are the moveable feature (animated for example in a shuffling manner) of the digitized visual icon. A fourth portion 210 of the display 200 shows the plurality of identical Chinese characters 54 after they are appropriately written by each user, whereby a treasure chest 56 opens up to provide credits when a Chinese character 54 is appropriately written by the user. Thus, each user is able to know a number of Chinese characters 54 which have been completed appropriately from a number of shown Chinese characters 54. The credits may be used either as a form of scoring or as a form of currency. The digitized visual icon may be able to demonstrate other forms of actions, such as, for example, cheering (when the digitized visual icon reaches the end point 48), clapping (when the user finishes writing a Chinese character 54), sleeping (when the user stops writing), and so forth.

The data processor in each of the portable computer 302(a), the tablet computer 302(b) and the mobile phone 302(c) may be for determining both a number of writing strokes and a correct order of the writing strokes required for the Chinese character 54 provided by the central server 304, counting writing strokes input through a contact-sensitive surface for each of the plurality of users, determining if an order of the writing strokes input through the contact-sensitive surface is in accordance with the correct order for each of the plurality of users, and determining a rate of writing stroke input through the contact-sensitive surface for each of the plurality of users.

Referring to FIG. 3, the contact-sensitive surface may be a touch pad 150 of the portable computer of FIG. 3(a), a touch-screen 160 of the tablet computer of FIG. 3(b), or a touch-screen 170 of the mobile phone of FIG. 3(c). It should be noted that the touch pad 150 is separate from the display 200 while the touch-screens 160, 170 are incorporated with the display 200.

The number of writing strokes and the correct order of the writing strokes required for the Chinese character 54 is determined by the data processor using a look-up table 100, an example which is shown in FIG. 7. The look-up table 100 may include columns for romanized pronunciation 102, word appearance 104, order of writing strokes 106 and number of writing strokes 108. Sample Chinese characters have not been provided in FIG. 7 as a Chinese font-type may not be present in all computers and as such may not be reproduced consistently when publishing the present specification.

The visual representation for a rate of writing for a Chinese character 54 for each of a plurality of users is generated by the data processor coupled to the display 200 of each of the plurality of users, and whereby the generated visual representation for each of the plurality of users is transmitted to the central server 304 and combined at the central server 304 to form a combined view of the visual representation for a rate of writing for a Chinese character 54 for the plurality of users, the combined view being shown in the first portion 202 of the display 200 as shown in FIG. 5. In this regard, the visual representation is partially generated by the central server 304.

Alternatively, both a number of writing strokes and a correct order of the writing strokes required for the Chinese character; writing strokes input through a contact-sensitive surface for each of the plurality of users; an order of the writing strokes input through the contact-sensitive surface is in accordance with the correct order for each of the plurality of users using the data processor coupled to the display of each of the plurality of users; and a rate of writing stroke input through the contact-sensitive surface for each of the plurality of users, are transmitted to the central server 304 and processed at the central server 304 to form a combined view of the visual representation for a rate of writing for a Chinese character for the plurality of users, the combined view being shown in the first portion 202 of the display 200 as shown in FIG. 5. In this regard, the visual representation is alternatively fully generated by the central server 304.

It should be noted that the system 300 advantageously provides the visual representation of writing the plurality of identical Chinese characters 54 which is fun and interactive for each user (80). Each user is able to refer to the visual representation when writing the plurality of identical Chinese characters 54 and monitor both their progress (discrete movement of digitized visual icon) and how their writing of the Chinese character 54 affects the rate of activity of the digitized visual icon (in terms of movement of the at least one moveable feature) with respect to other users.

Whilst there has been described in the foregoing description preferred embodiments of the present invention, it will be understood by those skilled in the technology concerned that many variations or modifications in details of design or construction may be made without departing from the present invention.

The invention claimed is:

1. A method for visually representing a rate of writing a plurality of identical Chinese characters for a plurality of users on a plurality of first portions of a plurality of displays on a plurality of user devices, wherein a different user device corresponds to each user in the plurality of users, each user device configured to generate a visual representation, the method including:
   presenting each user of the plurality of users with a Chinese character on a second portion of the display on each user's corresponding user device;
   determining both a number of writing strokes and a correct order of the writing strokes required for the Chinese character using a data processor coupled to the display on each user's corresponding device;
   counting writing strokes input through a contact-sensitive surface using the data processor coupled to the display on each user's corresponding device;
   determining a rate of writing stroke input through the contact-sensitive surface using the data processor coupled to the display on each user's corresponding device;
   determining if an order of the writing strokes input through the contact-sensitive surface is in accordance with the correct order using the data processor coupled to the display of each user's corresponding device;
   generating the visual representation for each user device based on the rate of writing and the order of writing of each user;
   transmitting, by each user device, each visual representation generated by each user device to a central server;
   combining, at the central server, each visual representation transmitted to the central server in order to generate a combined visual representation of the plurality of users' input;
   transmitting, by the central server, the combined visual representation of the plurality of users' input to each user's device; and
   displaying, on the first portion of the display of each user's device, the combined visual representation of the plurality of users' input;
   wherein the combined visual representation includes a plurality of digitized visual icons, each digitized visual icon representing each user in the plurality of users, each digitized visual icon capable of moving in a pre-defined manner from a starting point to an end point and movement of the icon and its rate of travel from the starting point to the end point is dependent on the counted input writing strokes, the order of input writing strokes, and the rate of writing stroke input, each digitized visual icon including at least one moveable feature to denote a rate of activity component.

2. The method of claim 1, wherein the at least one moveable feature is selected from a group consisting of: limbs, eyes, wheels, fins, flippers and wings.

3. The method of claim 1, wherein the contact-sensitive surface is either incorporated with or separate from the display.

4. The method of claim 1, wherein the number of writing strokes and the correct order of the writing strokes required for the Chinese character is determined by the data processor using a look-up table.

5. The method of claim 1, wherein the Chinese character is deemed to be not written when the order of the writing strokes input through the contact-sensitive surface is not in accordance with the correct order.

6. The method of claim 1, wherein the digitized visual icon is in a form selected from a group consisting of: an animal, an organism, a vehicle, and a humanoid.

7. A non-transitory computer readable medium comprising instructions to cause a processor and memory to execute a method for visually representing rate of writing a plurality of identical Chinese characters for a plurality of users on a plurality of first portions of a plurality of displays on a plurality of user devices, wherein a different user device corresponds to each user in the plurality of users, each user device configured to generate a visual representation, the method comprising:
   presenting each user of the plurality of users with a Chinese character on a second portion of the display on each user's corresponding user device;
   determining both a number of writing stokes and a correct order of the writing strokes required for the Chinese character using a data processor coupled to the display on each user's corresponding device;
   counting writing strokes input through a contact-sensitive surface using the data processor coupled to the display on each user's corresponding device;
   determining a rate of writing stroke input through the contact-sensitive surface using the data processor coupled to the display on each user's corresponding device;
   determining if an order of the writing strokes input through the contract-sensitive surface is in accordance with the correct order using the data processor coupled to the display of each user's corresponding device;
   generating the visual representation for each user device based on the rate of writing and the order of writing of each user;
   transmitting, by each user device, each visual representation generated by each user device to a central server;
   combining, at the central server, each visual representation transmitted to the central server in order to generate a combined visual representation of the plurality of users' input;
   transmitting, by the central server, the combined visual representation of the plurality of users' input to each user's device; and
   displaying, on the first portion of the display of each user's device, the combined visual representation of the plurality of users' input;
   wherein the combined visual representation includes a plurality of digitized visual icons, each digitized visual icon representing each user in the plurality of users, each digitized visual icon capable of moving in a pre-defined manner from a starting point to an end point and movement of the icon and its rate of travel from the starting point to the end point is dependent on the counted input writing strokes, the order of input writing strokes, and the rate of writing stroke input, each digitized visual icon including at least one moveable feature to denote a rate of activity component.

8. The non-transitory computer readable medium of claim 7, wherein the visual representation for a rate of writing for a Chinese character for each of a plurality of users is generated by the data processor coupled to the display of each of the plurality of users, and whereby the generated visual representation for each of the plurality of users is transmitted to the central server and combined at the central server to form a combined view of the visual representation for a rate of writing for a Chinese character for the plurality of users, the combined view being shown in the first portion of the display.

9. The non-transitory computer readable medium of claim 7, wherein the following:

both a number of writing strokes and a correct order of the writing strokes required for the Chinese character;
writing strokes input through a contact-sensitive surface for each of the plurality of users;
an order of the writing strokes input through the contact-sensitive surface is in accordance with the correct order for each of the plurality of users using the data processor coupled to the display of each of the plurality of users; and
a rate of writing stroke input through the contact-sensitive surface for each of the plurality of users;
are transmitted to the central server and processed at the central server to form a combined view of the visual representation for a rate of writing for a Chinese character for the plurality of users, the combined view being shown in the first portion of the display.

10. The non-transitory computer readable medium of claim 7, wherein the at least one moveable feature is selected from a group consisting: limbs, eyes, wheels, fins, flippers and wings.

11. The non-transitory computer readable medium of claim 7, wherein the contact-sensitive surface is either incorporated with or separate from the display.

12. The non-transitory computer readable medium of claim 7, wherein the number of writing strokes and the correct order of the writing strokes required for the Chinese character is determined by the data processor coupled to the display of each of the plurality of users using a look-up table.

13. The non-transitory computer readable medium of claim 7, wherein the data processor for each of the plurality of users is wirelessly connected to the central server.

14. The non-transitory computer readable medium of claim 7, wherein the Chinese character is deemed to be not written when the order of the writing strokes input through the contact-sensitive surface is not in accordance with the correct order for any of the plurality of users.

15. The non-transitory computer readable medium of claim 7, wherein the digitized visual icon is in a form selected from a group consisting of: an animal, an organism, a vehicle, and a humanoid.

16. A system for visually representing a rate of writing a plurality of identical Chinese characters for a plurality of users, the system comprising:
a plurality of user devices corresponding to the plurality of users, each user device including a first portion of a display on the user device, each user device configured to generate a visual representation; and
a central server;
wherein each user device configured for:
presenting a Chinese character on a second portion of the display on the user device;
determining both a number of writing strokes and a correct order of the writing stokes required for the Chinese character using a data processor coupled to the display on the user device;
counting writing stokes input through a contact-sensitive surface using the data processor coupled to the display on the user device;
determining a rate of writing stroke input through the contact-sensitive surface using the data processor coupled to the display on the user device;
determining if an order of the writing strokes input through the contact-sensitive surface is in accordance with the correct order using the data processor coupled to the display on the user device;
generating the visual representation based on the rate of writing and the order of writing of the corresponding user;
transmitting the visual representation generating the user device to a central server;
receiving the combined visual representation of the plurality of users' input; and
displaying, on the first portion of the display, the combined visual representation of the plurality of users' input;
wherein the central server is configured for:
combining each visual representation transmitted to the central server by a user device in the plurality of user devices in order to generate a combined visual representation of the plurality of users' input; and
transmitting the combined visual representation of the plurality of users' input to each user's device in the plurality of user devices; and
wherein the combined visual representation includes a plurality of digitized visual icons, each digitized visual icon representing each user in the plurality of users, each digitized visual icon capable of moving in a pre-defined manner from a starting point to an end point and movement of the icon and its rate of travel from the starting point to the end point is dependent on the counted input writing strokes, the order of input writing strokes, and the rate of writing stroke input, each digitized visual icon including at least one moveable feature to denote a rate of activity component.

17. The system of claim 16, wherein the visual representation for a rate of writing a plurality of identical Chinese characters for each of a plurality of users is generated by the data processor coupled to the display of each of the plurality of users, and whereby the generated visual representation for the plurality of users is transmitted to the central server and combined at the central server to form a combined view of the visual representation for a rate of writing for a Chinese character for the plurality of users, the combined view being shown in the first portion of the display.

18. The system of claim 16, wherein the following:
both the number of writing strokes and the correct order of the writing strokes required for the Chinese character;
the writing strokes input through a contact-sensitive surface for each of the plurality of users;
the rate of writing stroke input through the contact-sensitive surface for each of the plurality of users; and
the order of the writing strokes input through the contact-sensitive surface is in accordance with the correct order for each of the plurality of users using the data processor coupled to the display of each of the plurality of users;
are transmitted to the central server and processed at the central server to form a combined view of the visual representation for a rate of writing for a Chinese character for the plurality of users, the combined view being shown in the first portion of the display.

19. The system of claim 16, wherein the at least one moveable feature is selected from a group consisting of: limbs, eyes, wheels, fins, flippers and wings.

20. The system of claim 16, wherein the contact-sensitive surface is either incorporated with or separate from the display.

21. The system of claim 16, wherein the number of writing strokes and the correct order of the writing strokes required for the Chinese character is determined by the data processor coupled to the display of each of the plurality of users using a look-up table.

22. The system of claim 16, wherein the digitized visual icon is in a form selected from a group comprising: an animal, an organism, a vehicle, and a humanoid.

* * * * *